May 27, 1930.                C. E. PETERSON                1,760,660
                                  RAKE
                           Filed March 2, 1929

INVENTOR
Carl E. Peterson,
BY
Wm H. Caufield.
ATTORNEY

Patented May 27, 1930

1,760,660

UNITED STATES PATENT OFFICE

CARL E. PETERSON, OF UPPER MONTCLAIR, NEW JERSEY, ASSIGNOR TO EASTERN TOOL & MANUFACTURING COMPANY, OF BLOOMFIELD, NEW JERSEY

RAKE

Application filed March 2, 1929. Serial No. 343,951.

This invention relates to an improved rake for cleaning lawns and the like and which has spring tines which remove loose material but do not disturb grass that is growing or tear up the ground in which the grass is growing.

The object of the invention is to provide a rake in which the frame that holds the tines is light in weight but which holds the tines firmly and does not become separated at any of its joints under the strain and vibration of raking.

The invention is illustrated in the accompanying drawing in which Figure 1 is a bottom view of my improved rake removed from the handle. Figure 2 is an enlarged section on line 2—2 in Figure 1. Figure 3 is a detail view of one way of securing the rear end of a tine and Figure 4 is a similar view showing a modified form of connection. Figure 5 is a perspective view looking from underneath and showing the joint of the side arm and the brace of the rake.

The frame of the rake is made of metal strips and the part that is secured to the handle also forms the forward support for the tines. This strip is formed, first, into the cross-bar or brace 10 and then bent to form side arms 11 with an off-set 12 in each one. The strip is then bent inwardly and rearwardly to form arms 13, then into short arms 14 and then into return arms 15 which have the bent ends 16 lying next to the arms 11 immediately in rear of the off-set portions. The arm or brace 10 is provided with slits at spaced intervals.

The second brace 18 is formed of a strip of metal and it is bent over at its ends to embrace the arms 11, in rear of the off-set 12, and embrace the ends 16 of the first member. The off-set part 12 prevents the brace 18 from moving forward and the parts 11 and 16 in rear of the off-set 12 are outwardly inclined toward the rear so that the ends 19 can not move to the front or the rear after the ends are bent over.

The arm or brace 18 is slitted as at 20 and it lies in a plane substantially perpendicular to the plane of the brace 10.

The tines 21 are of spring metal and are passed through the slits 17 and then through the slits 20. Each tine is bent where it enters the slit 20 and then presses down to hold it against upward movement. This bend can be either toward the back as at 22 or toward the front as at 23. A broken tine can be quickly replaced without disturbing any of the other tines.

The brace 10 is bent into concavo-convex form in cross-section to give it the necessary stiffness. By bending over the parts 19 the whole structure is firmly held together as the arms 13 and 15 are secured together, the brace 18 can not move on the arms 12 and arms 12 are held from spreading.

The split ring 24 is passed around the two short arms 14 of the frame, and is clamped around a handle by a bolt passing through the holes 25 in the flanges 26 of the ring 24.

I claim:—

A rake comprising a strip of metal forming a cross-arm and rearwardly and outwardly extending side-arms having off-set portions therein, said strip then extending inwardly and rearwardly and then outwardly and forwardly with its end in engagement with the cross-arms at the offset portions, and a second-cross arm in rear of the first with its end bent around the side arms and the ends of the strip and in rear of said offset portions, the cross-arms having openings for receiving tines.

In testimony whereof I affix my signature.

CARL E. PETERSON.